(12) United States Patent
Sugai et al.

(10) Patent No.: US 9,422,994 B2
(45) Date of Patent: *Aug. 23, 2016

(54) MANUFACTURING METHOD OF CAST-IRON FRICTION MEMBER

(71) Applicant: AKEBONO BRAKE INDUSTRY CO., LTD., Tokyo (JP)

(72) Inventors: Yoshiyuki Sugai, Tokyo (JP); Katsuji Seki, Tokyo (JP); Takuya Takada, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 295 days.

This patent is subject to a terminal disclaimer.

(21) Appl. No.: 14/013,403

(22) Filed: Aug. 29, 2013

(65) Prior Publication Data

US 2014/0060704 A1 Mar. 6, 2014

(30) Foreign Application Priority Data

Aug. 31, 2012 (JP) .................................. 2012-192619

(51) Int. Cl.
*C23C 8/00* (2006.01)
*C23C 22/00* (2006.01)
*F16D 65/12* (2006.01)
(Continued)

(52) U.S. Cl.
CPC ................ *F16D 65/127* (2013.01); *C23C 8/30* (2013.01); *C23C 8/32* (2013.01); *C23C 8/80* (2013.01); *F16D 65/10* (2013.01); *F16D 65/12* (2013.01);
(Continued)

(58) Field of Classification Search
CPC .............. C23C 8/30; C23C 8/32; C23C 8/50; C23C 8/54; C23C 8/74
USPC ............ 148/218, 217; 118/218 R; 188/218 R
See application file for complete search history.

(56) References Cited

U.S. PATENT DOCUMENTS 5,679,411 A * 10/1997 Hoppe ............................ 427/528
2008/0000550 A1   1/2008 Holly et al.
(Continued)

FOREIGN PATENT DOCUMENTS

CN        102732820 A  * 10/2012
DE         19938009 C1    10/2000
(Continued)

OTHER PUBLICATIONS

Totten, George E., Kiyoshi Funatani, and Lin Xie. "Design of Nitrided and Nitrocarburized Materials." Handbook of Metallurgical Process Design. New York: Marcel Dekker, 2004. 573.*
(Continued)

*Primary Examiner* — Matthew E Hoban
*Assistant Examiner* — Anthony Liang
(74) *Attorney, Agent, or Firm* — Drinker Biddle & Reath LLP

(57) ABSTRACT

A cast-iron friction member is manufactured by: performing a nitrocarburizing treatment on a cast workpiece at a treatment temperature of 500° C. to 600° C. to thus form a nitrogen compound layer on a surface of the workpiece; and exposing the workpiece to an atmosphere when a temperature becomes 400° C. to 480° C. after the nitrocarburizing treatment so as to cool the workpiece to a room temperature while keeping a contact state with oxygen to thus form an iron oxide layer including $Fe_3O_4$ on a surface of the nitrogen compound layer.

6 Claims, 8 Drawing Sheets

(51) Int. Cl.
*C23C 8/30* (2006.01)
*C23C 8/32* (2006.01)
*C23C 8/80* (2006.01)
*F16D 65/10* (2006.01)

(52) U.S. Cl.
CPC . *F16D 2200/0013* (2013.01); *F16D 2250/0053* (2013.01)

(56) References Cited

U.S. PATENT DOCUMENTS

| | | |
|---|---|---|
| 2008/0118763 A1 | 5/2008 | Balow et al. |
| 2010/0044170 A1 | 2/2010 | Simpson et al. |
| 2011/0079326 A1 | 4/2011 | Hanna et al. |
| 2011/0151238 A1 | 6/2011 | Holly et al. |
| 2011/0186186 A1 | 8/2011 | Fukazawa et al. |
| 2011/0293849 A1 | 12/2011 | Lembach et al. |
| 2013/0133995 A1 | 5/2013 | Hanna et al. |
| 2013/0284318 A1 | 10/2013 | Lee et al. |
| 2014/0149053 A1 | 5/2014 | Sun et al. |

FOREIGN PATENT DOCUMENTS

| | | |
|---|---|---|
| JP | 53-371 | 1/1978 |
| JP | 3-285058 A | 12/1991 |
| JP | 6-307471 A | 11/1994 |
| JP | 3303741 B2 | 7/2002 |
| JP | 2010-053926 A | 3/2010 |

OTHER PUBLICATIONS

Extended European Search Report issued Mar. 8, 2016 in corresponding European Patent Application No. 13181982.3.
Extended European Search Report issued Mar. 16, 2016 in corresponding European Patent Application No. 13181985.6.

\* cited by examiner

MANUFACTURING METHOD OF CAST-IRON FRICTION MEMBER

BACKGROUND OF THE INVENTION

1. Field of the Invention

The invention relates to a manufacturing method of a cast-iron friction member.

2. Related Art

A frictional surface of a cast-iron friction member that is used for a vehicular disc brake rotor, a brake drum, a sliding part of a machine tool or the like is required to have high corrosion resistance and high wear resistance. Therefore, the surface of the cast-iron friction member has been formed with a coating film or zinc phosphate coating. However, the coating film or coating is worn or delaminated over long time, so that it is difficult to secure a sufficient corrosion resistance and wear resistance.

Compared to the above, a technology of performing a nitrocarburizing treatment on the frictional surface of the cast-iron friction member has been studied and utilized. The nitrocarburizing treatment is a surface treatment of enabling interstitial diffusion of nitrogen and carbon at the same time at a treatment temperature of A1 transformation point (727° C.) or lower, typically 550° C. to 580° C. In the nitrocarburizing treatment, since a hard layer of a nitrogen compound is formed on the outermost surface, it is possible to improve the corrosion resistance and wear resistance of the cast-iron friction member. Also, since a phase transformation is not accompanied in the nitrocarburizing treatment, the strain is less caused, compared to a carburization treatment and the like. As the nitrocarburizing treatment, a salt-bath nitrocarburizing treatment, a gas nitrocarburizing treatment, a plasma nitriding treatment and the like may be exemplified.

For example, JP-A-H06-307471 and JP-A-2010-053926 disclose performing a nitrocarburizing treatment on a surface of a cast-iron disc brake rotor so as to form a Fe—C—N based compound layer on the surface by the salt-bath nitrocarburizing treatment, thereby improving the corrosion resistance and wear resistance. However, the salt-bath nitrocarburizing treatment has a problem in terms of safety and environmental burden because harmful cyanide is used. Also, the salt-bath nitrocarburizing treatment has a problem that a porous layer is apt to be formed on an outermost surface of the formed compound layer.

JP-B2-3303741 discloses a gas nitrocarburizing treatment in which nitrocarburizing treatment processes under nitriding atmosphere of 200 Torr or lower including ammonia gas at a treatment temperature of 450° C. to 560° C. are performed two times interposing a diffusion treatment process therebetween. In this method, the harmful cyanide is not used, and the compound layer to be formed on the surface of the cast-iron friction member can be made to be dense. Also, since it is possible to suppress a thickness of the compound layer from being excessively increased, it is possible to improve the surface durability.

However, when the cast-iron friction member having the nitrogen compound layer formed on the surface thereof by the above method is exposed to outside environments over a long period, red rust ($Fe_2O_3$) may be formed on the surface due to influences of temperature and humidity. Even when the surface of the vehicular disc brake rotor is subject to the nitrocarburizing treatment, if the surface is eroded by the red rust ($Fe_2O_3$), vibration may occur or a braking force may be lowered upon braking. Also, in recent years, an aluminum alloy wheel having a high design property has been much utilized. Regarding this, when the red rust ($Fe_2O_3$) is present on a surface of the rotor, it can be securely seen even from the outside with naked eyes, so that an outward appearance of a vehicle is deteriorated.

Regarding the above problems, it is efficient to further form an iron oxide layer having $Fe_3O_4$ as a main component, which is referred to as black rust, on the surface of the nitrogen compound layer obtained by the nitrocarburizing treatment. Since the iron oxide layer is uniform and dense, it can effectively prevent the red rust ($Fe_2O_3$) from being formed on the surface of the iron-cast friction member.

As disclosed in JP-A-H03-285058, the iron oxide layer is formed by a method referred to as homo-treatment in which a target product is exposed to vapor of 400° C. to 500° C. for 1 to 1.5 hours. However, it is difficult to set conditions of the homo-treatment. That is, when the temperature is too high or the treatment time is too long, the red rust ($Fe_2O_3$) may be formed. Therefore, it is very difficult to form a uniform and dense black iron oxide layer over the entire frictional surface of the iron-cast friction member.

As a method replacing the homo-treatment, JP-B-S53-000371 discloses a method of treating a steel material in a mixed gas of a nitriding gas and a carburizing gas at 500° C. to 600° C. for 0.5 to 3 hours, taking out the steel material from a furnace at the treatment temperature, holding the same in air for 60 to 120 seconds to thus form a $Fe_3O_4$ film and then cooling the steel material having the film formed thereon to a room temperature in oil. According to this method, it is possible to continuously perform the nitrocarburizing treatment, the iron oxide layer formation and the cooling treatment, so that it is possible to form the iron oxide layer of a good quality on the surface of the steel material.

Patent Document 1: JP-A-H06-307471
Patent Document 2: JP-A-2010-053926
Patent Document 3: JP-B2-3303741
Patent Document 4: JP-A-H03-285058
Patent Document 5: JP-B-S53-000371

However, according to the method disclosed in JP-B-S53-000371, after the nitrocarburizing treatment is performed, the target product is taken out from the furnace, as it is with being heated, the iron oxide layer is thus formed and then the target product is rapidly cooled (oil cooling). Thereby, a crack may be formed in the nitrogen compound layer or the iron oxide layer including $Fe_3O_4$.

SUMMARY OF THE INVENTION

One or more embodiments provide a manufacturing method of a cast-iron friction member capable of forming an iron oxide layer including $Fe_3O_4$ with a simple method on a surface of a nitrocarburized cast-iron friction member, thereby improving corrosion resistance and wear resistance of the member and suppressing crack formation due to manufacturing process.

In accordance with embodiments, a cast-iron friction member may be manufactured by: performing a nitrocarburizing treatment on a cast workpiece at a treatment temperature of 500° C. to 600° C. to thus form a nitrogen compound layer on a surface of the workpiece; and after performing the nitrocarburizing treatment and when a temperature becomes 400° C. to 480° C., exposing the workpiece to an atmosphere and cooling the workpiece to a room temperature while keeping a contact state with oxygen to thus form an iron oxide layer including $Fe_3O_4$ on a surface of the nitrogen compound layer.

In the above method, the nitrocarburizing treatment may include a gas nitrocarburizing treatment.

In the above method, the nitrocarburizing treatment may be performed under conditions that holding time at the treatment temperature is 0.5 to 4 hours. In the nitrocarburizing treatment, $NH_3$ may be used as a nitrogen supply source and a carburizing gas is used as a carbon supply source.

In the above method, the cast-iron friction member may be a vehicular disc brake rotor.

According to embodiments, it is possible to manufacture an cast-iron friction member having excellent corrosion resistance and wear resistance and having little crack in a nitrogen compound layer or iron oxide layer at low cost.

DETAILED DESCRIPTION OF THE EMBODIMENTS

Figure 1A:
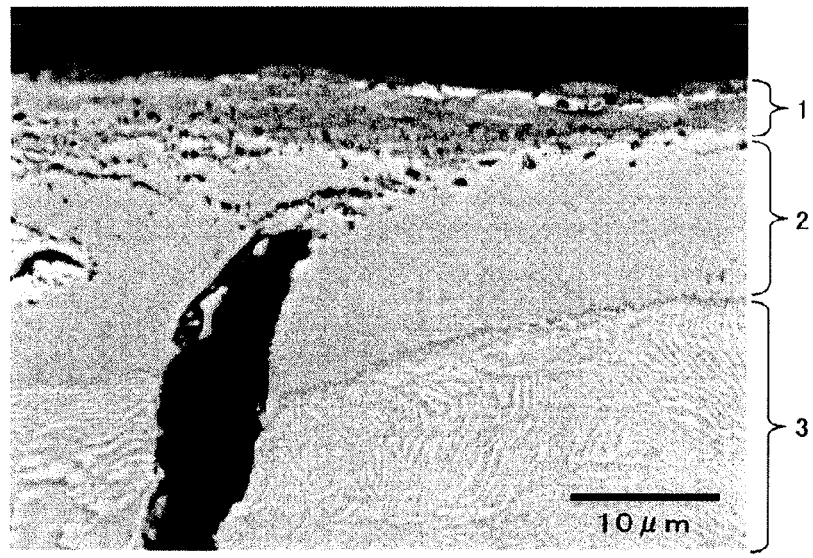
FIG. 1A shows a section photograph in a vicinity of a surface of a vehicular disc brake rotor obtained in an example 1.

According to exemplary embodiments, a manufacturing method of a cast-iron friction member includes a process (hereinafter, referred to as a nitrocarburizing treatment process) of performing a nitrocarburizing treatment on a cast workpiece, at a treatment temperature of 500° C. to 600° C. to thus form a nitrogen compound layer on a surface of the workpiece and a process (hereinafter, referred to as an iron oxide layer forming process) of, when a temperature becomes 400° C. to 480° C. after the nitrocarburizing process, exposing the workpiece to an atmosphere and cooling the workpiece to a room temperature under oxygen to thus form an iron oxide layer including $Fe_3O_4$ on a surface of the nitrogen compound layer.

The invention may be appropriately applied to an cast-iron friction member that is formed by cast-molding gray cast iron or ductile cast iron such as FC200, FC250, FCD450 and the like. The cast-iron friction member may be a vehicular disc brake rotor, a brake drum, a machine tool and the like, which are required to have high wear resistance and high corrosion resistance. Among them, the invention can be suitably applied to the vehicular disc brake rotor. Thus, in the below descriptions, as exemplary embodiments of the invention, a case in which a nitrogen compound layer and an iron oxide layer having $Fe_3O_4$ as a main component are formed on the vehicular disc brake rotor is described. Since a casting process, a deburring process and the like can be similar to those of the related art, detailed descriptions thereof are omitted.

(1) Nitrocarburizing Treatment Process

According to exemplary embodiments, as the nitrocarburizing treatment method, a salt-bath nitrocarburizing treatment method, a gas nitrocarburizing treatment method, a plasma nitriding treatment method and the like may be used. The gas nitrocarburizing treatment method would be preferable from standpoints of safety and stable formation of a nitrogen compound layer of a good quality.

When performing the nitrocarburizing treatment by the gas nitrocarburizing treatment method, a gas nitriding furnace can be used. As for nitriding treatment conditions, for example, when performing the nitrocarburizing treatment for the vehicular disc brake rotor, the treatment temperature may be set to be 500° C. to 600° C., preferably 530° C. to 590° C. When the treatment temperature is lower than 500° C., it is not possible to form a nitrogen compound layer having a sufficient thickness. On the other hand, when the treatment temperature exceeds 600° C., the nitrogen compound layer is embrittled, so that a crack and the like may be formed.

The treatment temperature may be held preferably for 0.5 to 4 hours, more preferably 1 to 3 hours. When the treatment time is less than 0.5 hour, it is not possible to form a nitrogen compound layer having a sufficient thickness. On the other hand, even when the treatment time exceeds 4 hours, the nitrogen compound layer does not substantially grow any more, so that the productivity is lowered.

As a nitrogen supply source, $NH_3$ that is a nitriding gas may be used. In the meantime, a carbon supply source is not particularly limited insomuch as it is a carburizing gas, for example, hydrocarbon containing alcohol such as $CH_3OH$ or CO, $CO_2$ and the like may be used. In particular, it is preferable to supply nitrogen and carbon by a mixed gas of $NH_3$ and $CH_3OH$ from a standpoint of effectively forming the nitrogen compound layer at low cost. In this case, a flow rate of $NH_3$ is preferably 4.5 $m^3/h$ to 5.5 $m^3/h$ and a flow rate of $CH_3OH$ is preferably $3.0 \times 10^{-5}$ $m^3/h$ to $1.0 \times 10^{-4}$ m3/h.

A pressure in the gas nitriding furnace is preferably adjusted to be higher than the atmospheric pressure by 0.2 kPa to 1.0 kPa, typically 0.5 kPa to 0.7 kPa, like the general gas nitrocarburizing treatment.

The nitrocarburizing treatment is performed based on the above conditions, so that a nitrogen compound layer consisting of $Fe_3N$ and the like is formed on a surface of the vehicular disc brake rotor. A thickness of the nitrogen compound layer is appropriately selected depending on the utility thereof and the like. For the vehicular disc brake rotor, the thickness is 5 μm to 25 μm, preferably 10 μm to 20 μm. According to exemplary embodiments, the nitrocarburizing treatment is performed based on the above conditions, so that it is possible to easily form the nitrogen compound layer having the thickness.

(2) Iron Oxide Layer Forming Process

According to exemplary embodiment, after the nitrocarburizing treatment process, an iron oxide layer having $Fe_3O_4$ as a main component is formed on a surface of the obtained nitrogen compound layer. Since the iron oxide layer is very uniform and dense, it is possible to reduce influences of humidity and temperature, compared to a configuration where only the nitrocarburizing treatment is performed. Thereby, it is possible to keep the corrosion resistance and wear resistance of the vehicular disc brake rotor at high levels for a long period. Particularly, according to exemplary embodiments, since it is possible to form the iron oxide layer without using a special apparatus and without using a complex process, it is possible to suppress the deterioration of the productivity and the cost increase, which are accompanied as the iron oxide layer is formed, to the minimum, so that the industrial meaning thereof is very great.

Specifically, after the nitrocarburizing treatment, when the temperature in the furnace becomes 400° C. to 480° C., preferably 410° C. to 470° C., more preferably 420° C. to 460° C., the vehicular disc brake rotor is taken out from the gas nitriding furnace, is thus exposed to the atmosphere and is then cooled to a room temperature (20° C. to 25° C.) while keeping the contact state with oxygen in the atmosphere. The vehicular disc brake rotor is taken out from the gas nitriding furnace within the above temperature range, so that it is possible to form a uniform and dense iron oxide layer having $Fe_3O_4$ as a main component on a surface of the nitrogen compound layer.

When the temperature at which the vehicular disc brake rotor is taken out is lower than 400° C., oxidizing progress of the nitrogen compound layer is decreased, so that it is not possible to obtain a uniform and dense iron oxide layer having $Fe_3O_4$ as a main component. On the other hand, when the temperature exceeds 480° C., a proportion of $Fe_2O_3$ in the iron oxide layer is increased, and a crack is caused in the nitrogen compound layer by thermal shock due to rapid oxidation and a temperature difference.

According to exemplary embodiments, after the vehicular disc brake rotor is taken out from the gas nitriding furnace, the rotor is continuously exposed to the atmosphere until it is cooled to the room temperature. As described in JP-B-53-000371, when the workpiece is kept in the air for predetermined time and is then oil-cooled with being isolated from the air contact, the oil may remain in a plurality of holes formed on the surface of the iron oxide layer, which has an influence on friction characteristics. Thus, the method of JP-B-53-000371 is not suitable for manufacturing a cast-iron friction member that is used for a sliding part of a vehicular disc brake rotor and the like. Compared to this, according to exemplary embodiment, since the rotor is slowly cooled to the room temperature with being contacted to the oxygen, the above problems are not caused.

The cooling rate from the exposure of the vehicular disc brake rotor to the atmosphere to the room temperature is preferably 1° C./min to 10° C./min, more preferably 2° C./min to 8° C./min. When the cooling rate is less than 1° C./min, the productivity is deteriorated, and when the cooling rate exceeds 10° C./min, a crack may be formed in the nitrogen compound layer or iron oxide layer. Typically, when the vehicular disc brake rotor is kept with being exposed to the atmosphere, it is cooled at the above cooling rate.

According to exemplary embodiment, a film thickness of the iron oxide layer is 2 μm to 7 μm, preferably 3 μm to 6 μm. When the film thickness of the iron oxide layer is less than 2 μm, it is not possible to secure the sufficient corrosion resistance and wear resistance. On the other hand, even when the film thickness exceeds 7 μm, it is not possible to expect further improved effect.

EXAMPLES

Example 1

The cast iron material (equivalent to FC200) was used as the material to cast a vehicular disc brake rotor having a diameter of 355 mm and a thickness of 32 mm and unnecessary parts (sprue, burr and the like) were removed. Then, the obtained vehicular disc brake rotor was degreased by an alcohol-based cleaning agent. After that, the vehicular disc brake rotor was put into a gas nitrocarburizing furnace (Fujikoshi Corp., EQ-6S type) and the nitrocarburizing treatment was then performed in which the treatment temperature was set to be 570° C. (controlling range: 565° C. to 575° C.) and the holding time at the treatment temperature was set to be 100 minutes (controlling range: 95 minutes to 105 minutes). At this time, ammonia of 5.0 m³/h (controlling range: 4.5 m³/h to 5.5 m³/h) was used as the nitrogen supply source and methanol of 0.05 L/h (controlling range: 0.03 L/h to 0.10 L/h) was used as the carbon supply source.

After the nitriding treatment was over, the rotor was cooled in the gas nitrocarburizing furnace and was then taken out from the furnace and thus exposed to the atmosphere when the temperature in the furnace became 440° C. Then, the vehicular disc brake rotor was cooled to the room temperature (25° C.) in the atmosphere over 2 hours.

Figure 1B:
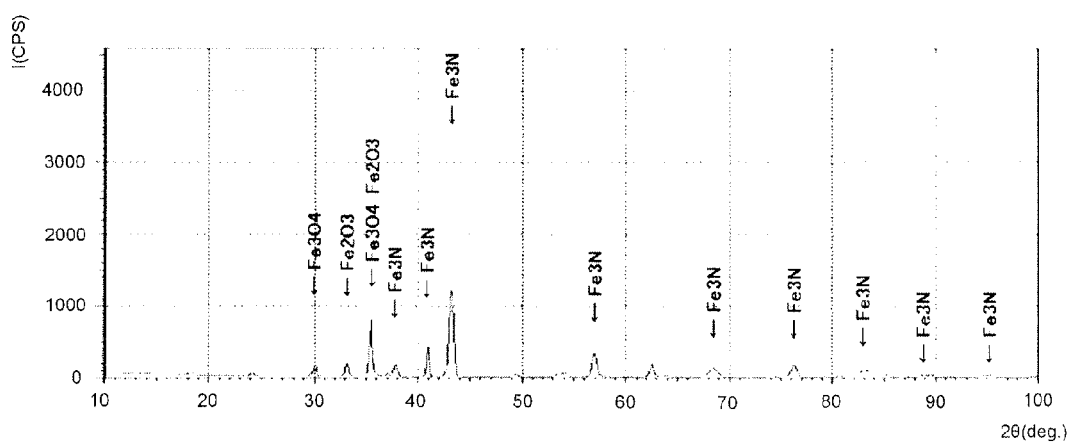
FIG. 1B shows an X-ray diffraction analysis result of the vehicular disc brake rotor obtained in the example 1.

A section in the vicinity of a surface of the obtained vehicular disc brake rotor was observed with a SEM (Nihon Denshi Co., Ltd., JSM-5800 LV). The SEM photograph is shown in FIG. 1A and an analysis result of a composition of the surface, which was obtained by an X-ray diffraction using an X-ray diffraction apparatus (Shimadzu Corporation, XRD6100), is shown in FIG. 1B. From the views, it was confirmed in the Example 1 that a uniform and dense iron oxide layer 1 having $Fe_3O_4$ as a main component was formed on a nitrogen compound layer 2.

After that, a 5% salt spray test (JIS Z2371) was performed by spraying a brine of 5% to the rotor for 72 hours using a salt spray test apparatus (Suga Test Instruments Co., Ltd., complex cycle test machine CY90) and then drying the same for 96 hours. As a result, it was confirmed in the Example 1 that red rust ($Fe_2O_3$) was formed on a part (an area ratio: about 20%) of the surface.

Example 2

Figure 2A:
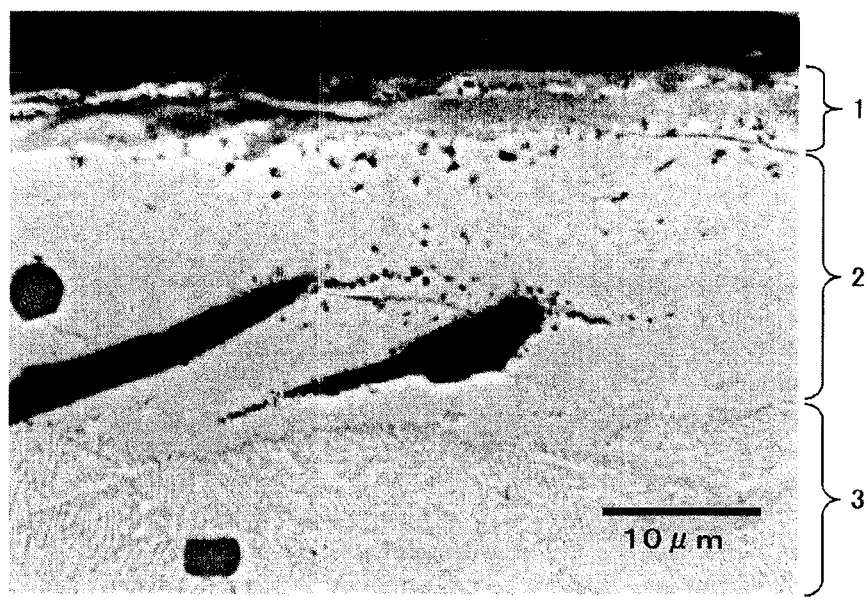
FIG. 2A shows a section photograph in a vicinity of a surface of a vehicular disc brake rotor obtained in an example 2.
Figure 2B:
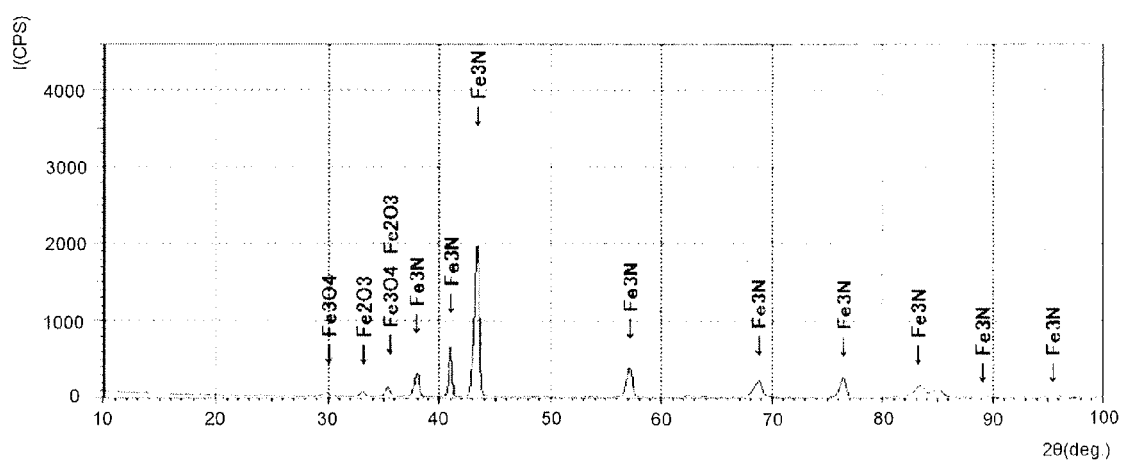
FIG. 2B shows an X-ray diffraction analysis result of the vehicular disc brake rotor obtained in the example 2.

A vehicular disc brake rotor was obtained under similar conditions as the Example 1, except that the rotor was taken out from the furnace and thus exposed to the atmosphere when the temperature in the furnace became 400° C. Similar to the Example 1, the SEM observation and the X-ray diffraction analysis were performed for the vehicular disc brake rotor. As a result, it was confirmed that a uniform and dense iron oxide layer 1 having $Fe_3O_4$ as a main component was formed on a nitrogen compound layer 2 (refer to FIGS. 2A and 2B).

Also, similar to the Example 1, the 5% salt spray test was performed. As a result, it was confirmed that red rust ($Fe_2O_3$) was formed on a part (an area ratio: about 20%) of the surface.

Example 3

Figure 3A:
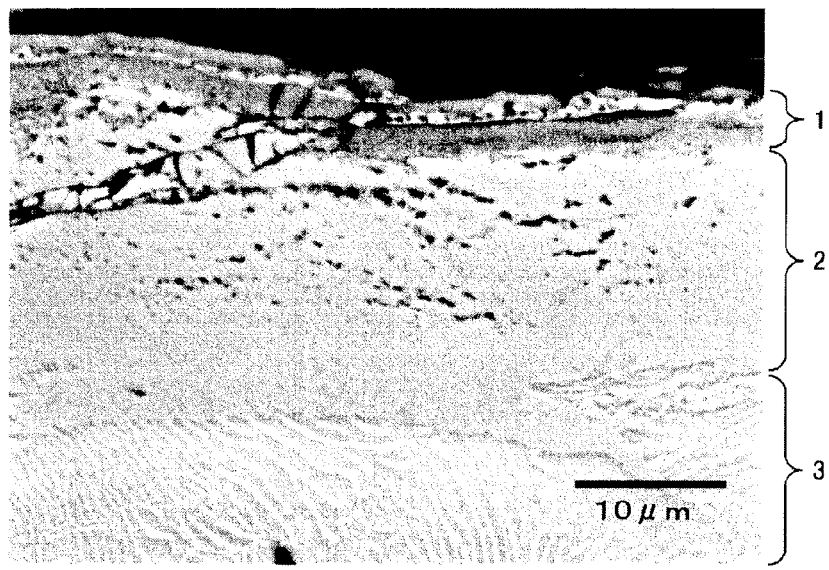
FIG. 3A shows a section photograph in a vicinity of a surface of a vehicular disc brake rotor obtained in an example 3.
Figure 3B:
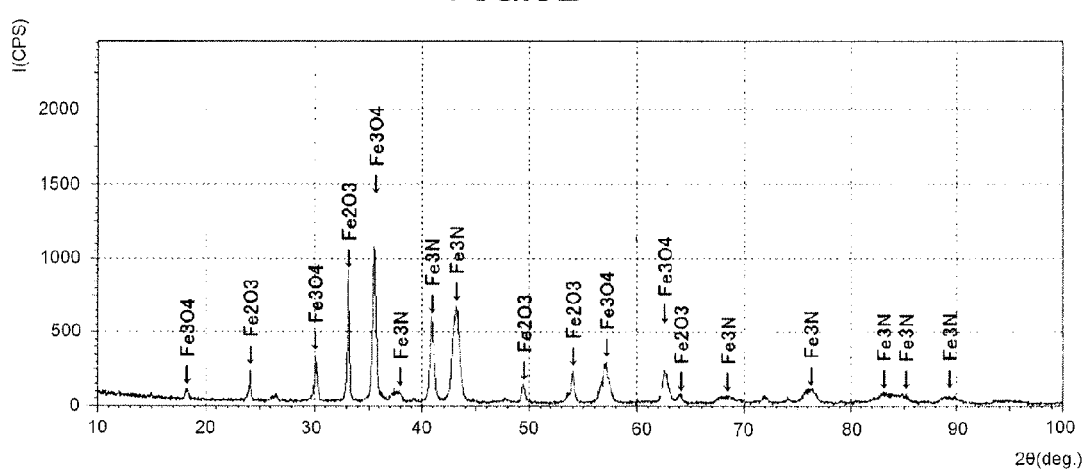
FIG. 3B shows an X-ray diffraction analysis result of the vehicular disc brake rotor obtained in the example 3.

A vehicular disc brake rotor was obtained under similar conditions as the Example 1, except that the rotor was taken out from the furnace and thus exposed to the atmosphere when the temperature in the furnace became 480° C. Similar to the Example 1, the SEM observation and the X-ray diffraction analysis were performed for the vehicular disc brake rotor. As a result, it was confirmed that a uniform and dense iron oxide layer 1 having $Fe_3O_4$ as a main component was formed on a nitrogen compound layer 2 (refer to FIGS. 3A and 3B).

Also, similar to the Example 1, the 5% salt spray test was performed. As a result, it was confirmed that red rust ($Fe_2O_3$) was formed on a part (an area ratio: about 20%) of the surface.

Comparative Example 1

Figure 4A:
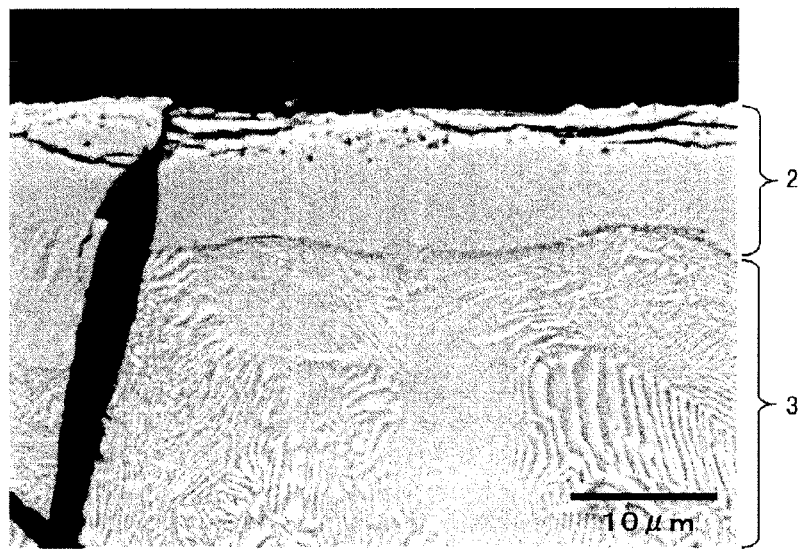
FIG. 4A shows a section photograph in a vicinity of a surface of a vehicular disc brake rotor obtained in a comparative example 1.
Figure 4B:
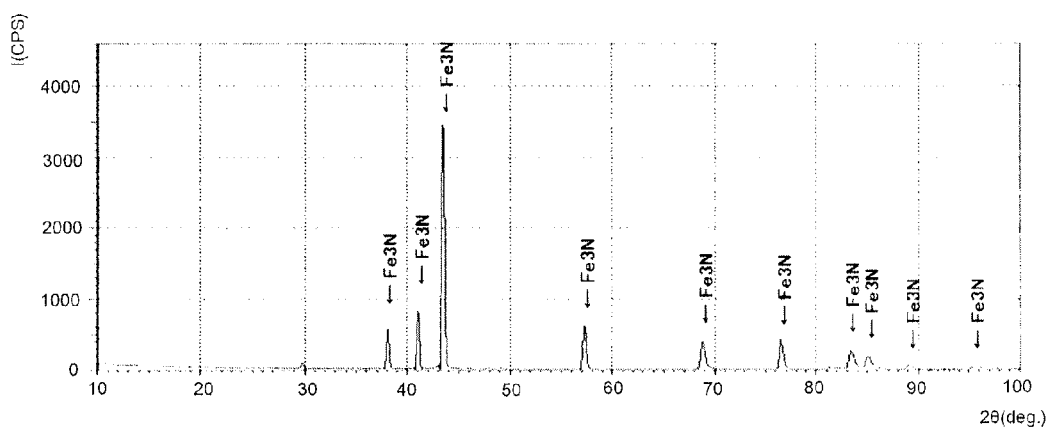
FIG. 4B shows an X-ray diffraction analysis result of the vehicular disc brake rotor obtained in the comparative example 1.

A vehicular disc brake rotor was obtained under similar conditions as the Example 1, except that the rotor was cooled to the room temperature in the furnace after the nitrocarburizing treatment. Similar to the Example 1, the section observation in the vicinity of the surface and the X-ray diffraction analysis were performed for the vehicular disc brake rotor. As a result, a nitrogen compound layer 2 was seen on the surface of the rotor but an iron oxide layer having $Fe_3O_4$ as a main component was not confirmed (refer to FIGS. 4A and 4B).

Also, similar to the Example 1, the 5% salt spray test was performed. As a result, it was confirmed that red rust ($Fe_2O_3$) was formed on a part (an area ratio: about 40%) of the surface.

Comparative Example 2

Figure 5A:
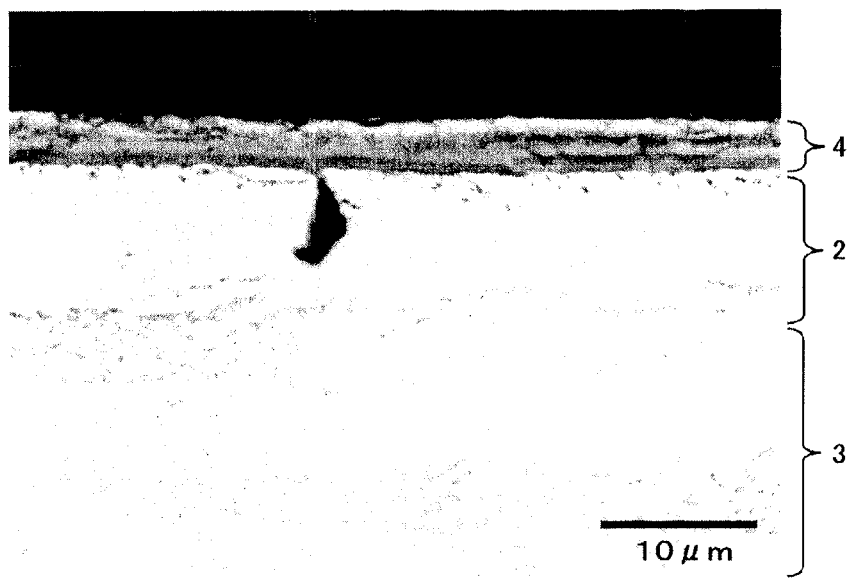
FIG. 5A shows a section photograph in a vicinity of a surface of a vehicular disc brake rotor obtained in a comparative example 2.
Figure 5B:
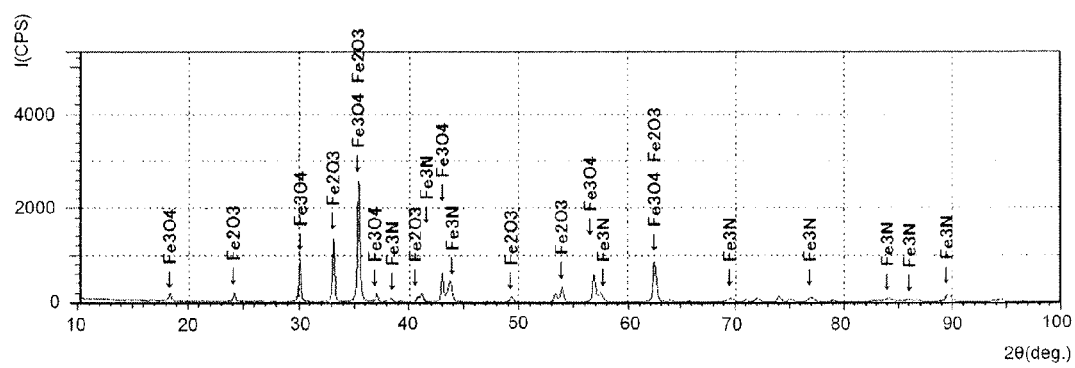
FIG. 5B shows an X-ray diffraction analysis result of the vehicular disc brake rotor obtained in the comparative example 2.

A vehicular disc brake rotor was obtained under similar conditions as the Example 1, except that the rotor was cooled to the room temperature in the furnace after the nitrocarburizing treatment and then the homo treatment was performed by enabling the vehicular disc brake rotor to pass through the overheated vapor, which was heated to 500° C. (controlling range: 495° C. to 505° C.), for 40 minutes (controlling range: 35 minutes to 45 minutes). Similar to the Example 1, the SEM observation and the X-ray diffraction analysis were performed for the vehicular disc brake rotor. As a result, it was confirmed that a uniform and dense iron oxide layer 4 having $Fe_3O_4$ as a main component was formed on a nitrogen compound layer 2 (refer to FIGS. 5A and 5B).

Also, similar to the Example 1, the 5% salt spray test was performed. As a result, it was confirmed that red rust ($Fe_2O_3$) was formed on a part (an area ratio: about 20%) of the surface.

Further, in the homo treatment, the controlling ranges of the respective parameters were stricter than those of the Example 1. Thus, when the treatment temperature or treatment time was too high or too long and was thus deviated from the controlling range, it was confirmed that red rust ($Fe_2O_3$) was formed on the surface of the vehicular disc brake rotor during the homo treatment.

Comparative Example 3

Similar to the Example 1, the 5% salt spray test was performed for a vehicular disc brake rotor that was not subject to the surface treatment such as nitrocarburizing treatment. As a result, it was confirmed that red rust ($Fe_2O_3$) was formed on the entire surface (an area ratio: about 100%).

Comparative Example 4

Figure 6A:
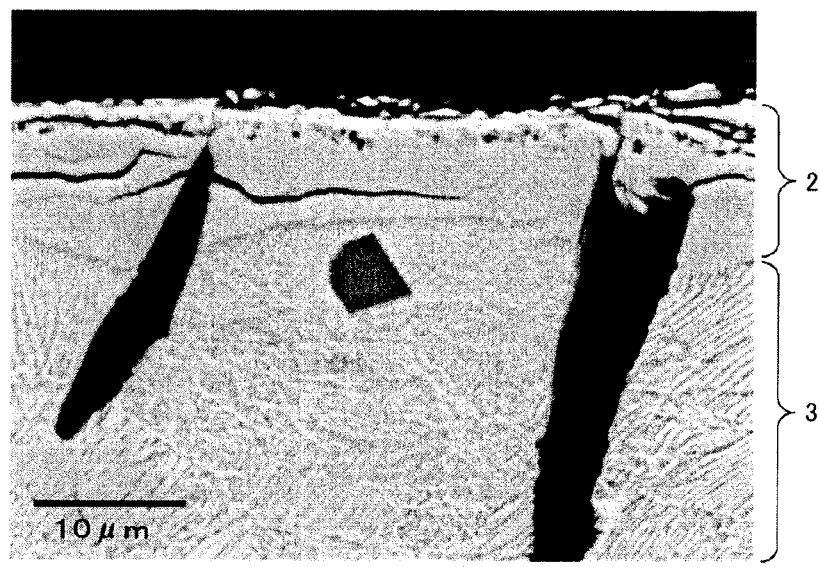
FIG. 6A shows a section photograph in a vicinity of a surface of a vehicular disc brake rotor obtained in a comparative example 4.
Figure 6B:
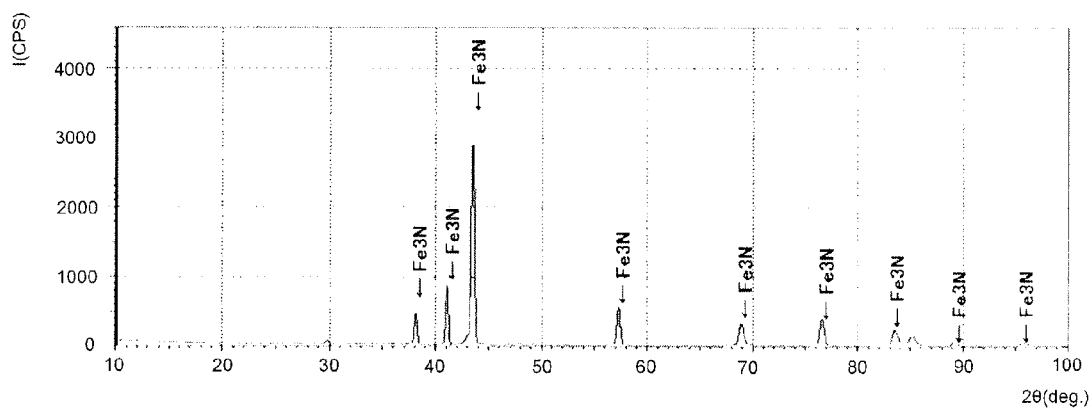
FIG. 6B shows an X-ray diffraction analysis result of the vehicular disc brake rotor obtained in the comparative example 4.

A vehicular disc brake rotor was obtained under the similar condition as the Example 1, except that the rotor was cooled to 300° C. in the furnace after the nitrocarburizing treatment and then exposed to the atmosphere. Similar to the Example 1, the SEM observation and the X-ray diffraction analysis were performed for the vehicular disc brake rotor. As a result, a nitrogen compound layer 2 was seen on the surface of the rotor but an iron oxide layer having $Fe_3O_4$ as a main component was not confirmed (refer to FIGS. 6A and 6B).

Also, similar to the Example 1, the 5% salt spray test was performed. As a result, it was confirmed that red rust ($Fe_2O_3$) was formed on a part (an area ratio: about 40%) of the surface.

Comparative Example 5

Figure 7A:
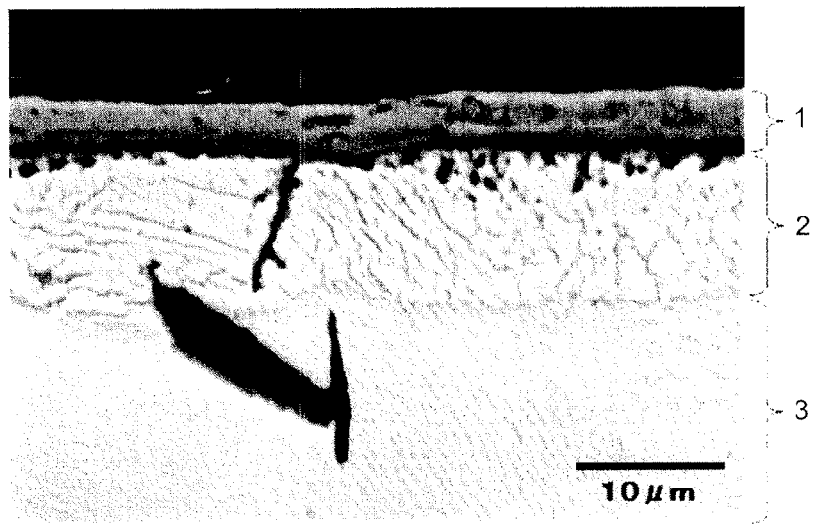
FIG. 7A shows a section photograph in a vicinity of a surface of a vehicular disc brake rotor obtained in a comparative example 5.
Figure 7B:
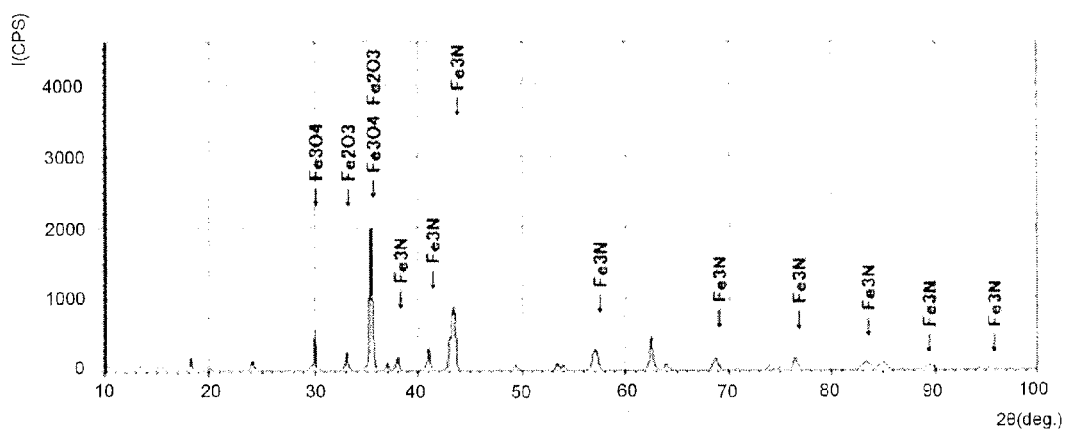
FIG. 7B shows an X-ray diffraction analysis result of the vehicular disc brake rotor obtained in the comparative example 5.

A vehicular disc brake rotor was obtained under similar conditions as the Example 1, except that the rotor was taken out from the furnace and thus exposed to the atmosphere when the temperature in the furnace became 500° C. Similar to the Example 1, the SEM observation and the X-ray diffraction analysis were performed for the vehicular disc brake rotor. As a result, it was confirmed that a uniform and dense iron oxide layer 1 having $Fe_3O_4$ as a main component was formed on a nitrogen compound layer 2 (refer to FIGS. 7A and 7B). However, it was also confirmed that while a peak of $Fe_3O_4$ was stronger than that of the Example 1, a peak of iron nitride was reduced. The reason would be as follows. Since the rotor was exposed to the atmosphere at higher temperature, so that a decomposition reaction of iron nitride by an oxidation action was accelerated. Also, in the comparative example 5, it was confirmed that a plurality of cracks was formed in the nitrogen compound layer 2. That is, since the rotor was taken out at the higher temperature, an internal structure was influenced by thermal shock due to rapid oxidation and temperature difference.

Also, similar to the Example 1, the 5% salt spray test was performed. As a result, it was confirmed that red rust ($Fe_2O_3$) was formed on a part (an area ratio: about 45%) of the surface. The reason would be as follows. Since the brine used in the salt spray test passed through the cracks formed in the nitrogen compound layer 2 and reached an internal nitrogen diffusion layer 3, further a cast-iron base, the effect of preventing the formation of red rust ($Fe_2O_3$) was lowered.

Comparative Example 6

Figure 8A:
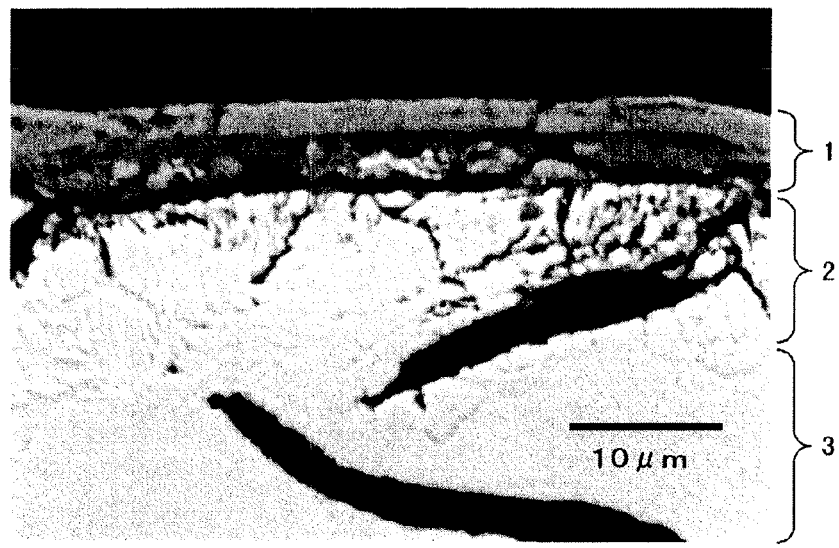
FIG. 8A shows a section photograph in a vicinity of a surface of a vehicular disc brake rotor obtained in a comparative example 6.
Figure 8B:
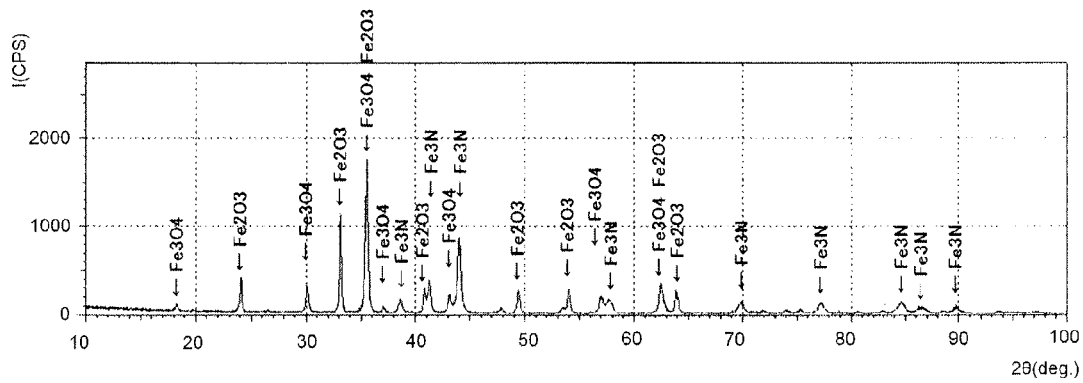
FIG. 8B shows an X-ray diffraction analysis result of the vehicular disc brake rotor obtained in the comparative example 6.

A vehicular disc brake rotor was obtained under similar conditions as the Example 1, except that the rotor was immediately exposed to the atmosphere after the nitrocarburizing treatment. Similar to the Example 1, the SEM observation and the X-ray diffraction analysis were performed for the vehicular disc brake rotor. As a result, it was confirmed that a uniform and dense iron oxide layer 1 having $Fe_3O_4$ as a main component was formed on a nitrogen compound layer 2 (refer to FIGS. 8A and 8B). However, it was confirmed in the comparative example 6 that a plurality of cracks was formed in the nitrogen compound layer 2 and an iron oxide layer 1 was partially peeled off. The reason would be as follows. Since the rotor was taken out at the higher temperature, an internal structure was influenced by thermal shock due to rapid oxidation and temperature difference.

Also, similar to the Example 1, the 5% salt spray test was performed. As a result, it was confirmed that red rust ($Fe_2O_3$) was formed on a part (an area ratio: about 50%) of the surface. The reason may be as follows. Like the comparative example 5, since the brine used in the salt spray test reached an internal nitrogen diffusion layer 3, the effect of preventing the formation of red rust ($Fe_2O_3$) was remarkably lowered.

The results of the respective tests in the examples 1 to 3 and the comparative examples 1 to 6 are shown in a table 1. Also, the compositions of the surfaces of the vehicular disc brake rotors obtained in the examples 1 to 3 and the comparative examples 1 to 6 were analyzed by a fluorescent X-ray analysis apparatus (Nihon Denshi Co., Ltd., EDS Super Helicon) and are shown in a table 2.

TABLE 1

|  | Treatment method | taking out temperature (° C.) | $Fe_3O_4$ peak | $Fe_2O_3$ area ratio (%) |
|---|---|---|---|---|
| Example 1 | nitrocarburizing + exposure to atmosphere | 440 | yes | 20 |
| Example 2 | nitrocarburizing + exposure to atmosphere | 400 | yes | 20 |
| Example 3 | nitrocarburizing + exposure to atmosphere | 480 | yes | 20 |
| comparative example 1 | nitrocarburizing | — | no | 40 |
| comparative example 2 | nitrocarburizing + homo treatment | — | yes | 20 |
| comparative example 3 | no treatment | — | no | 100 |
| comparative example 4 | nitrocarburizing + exposure to atmosphere | 300 | no | 40 |
| comparative example 5 | nitrocarburizing + exposure to atmosphere | 500 | yes | 45 |
| comparative example 6 | nitrocarburizing + exposure to atmosphere | 570 | yes | 50 |

TABLE 2

|  | N (wt %) | O (wt %) | Fe (wt %) |
|---|---|---|---|
| Example 1 | 0.5 | 36.5 | 59.0 |
| Example 2 | 9.5 | 18.0 | 69.0 |
| Example 3 | 0.5 | 37.0 | 58.0 |
| comparative example 1 | 14.5 | 3.5 | 77.0 |
| comparative example 2 | 0.5 | 37.0 | 59.0 |
| comparative example 4 | 13.0 | 9.0 | 74.0 |
| comparative example 5 | 0.3 | 37.0 | 59.0 |
| comparative example 6 | 0.3 | 37.5 | 60.0 |

This application claims foreign priority from Japanese Patent Application No. 2012-192619 filed on Aug. 31, 2012, the entire contents of which are hereby incorporated by reference.

DESCRIPTION OF REFERENCE NUMERALS

1 Iron oxide layer ($Fe_3O_4$ layer)
2 Nitrogen compound layer by nitrocarburizing treatment
3 Diffusion layer by nitrocarburizing treatment
4 Iron oxide layer ($Fe_3O_4$ layer) by homo treatment

What is claimed is:

1. A manufacturing method of a cast-iron friction member, the method comprising:
    performing a nitrocarburizing treatment on a cast workpiece at a treatment temperature of 500° C. to 600° C. in a furnace to thus form a nitrogen compound layer on a surface of the workpiece;
    keeping the workpiece in the furnace until a temperature becomes 400° C. to 480° C. after performing the nitrocarburizing treatment; and
    when the temperature becomes 400° C. to 480° C. after performing the nitrocarburizing treatment, exposing the workpiece to air and cooling the workpiece to a room temperature while keeping a contact state with oxygen to thus form an iron oxide layer including $Fe_3O_4$ on a surface of the nitrogen compound layer.

2. The method according to claim 1, wherein performing the nitrocarburizing treatment includes performing a gas nitrocarburizing treatment.

3. The method according to claim 2, wherein the nitrocarburizing treatment is performed under conditions that holding time at the treatment temperature is 0.5 to 4 hours, and
    wherein, in the nitrocarburizing treatment, $NH_3$ is used as a nitrogen supply source and a carburizing gas is used as a carbon supply source.

4. The method according to claim 1, wherein the cast-iron friction member is a vehicular disc brake rotor.

5. The method according to claim 2, wherein the cast-iron friction member is a vehicular disc brake rotor.

6. The method according to claim 3, wherein the cast-iron friction member is a vehicular disc brake rotor.

* * * * *